Dec. 9, 1947.  H. A. HENDRICKSON, JR  2,432,420
SAW FILING MACHINE
Filed Aug. 1, 1945  3 Sheets-Sheet 2
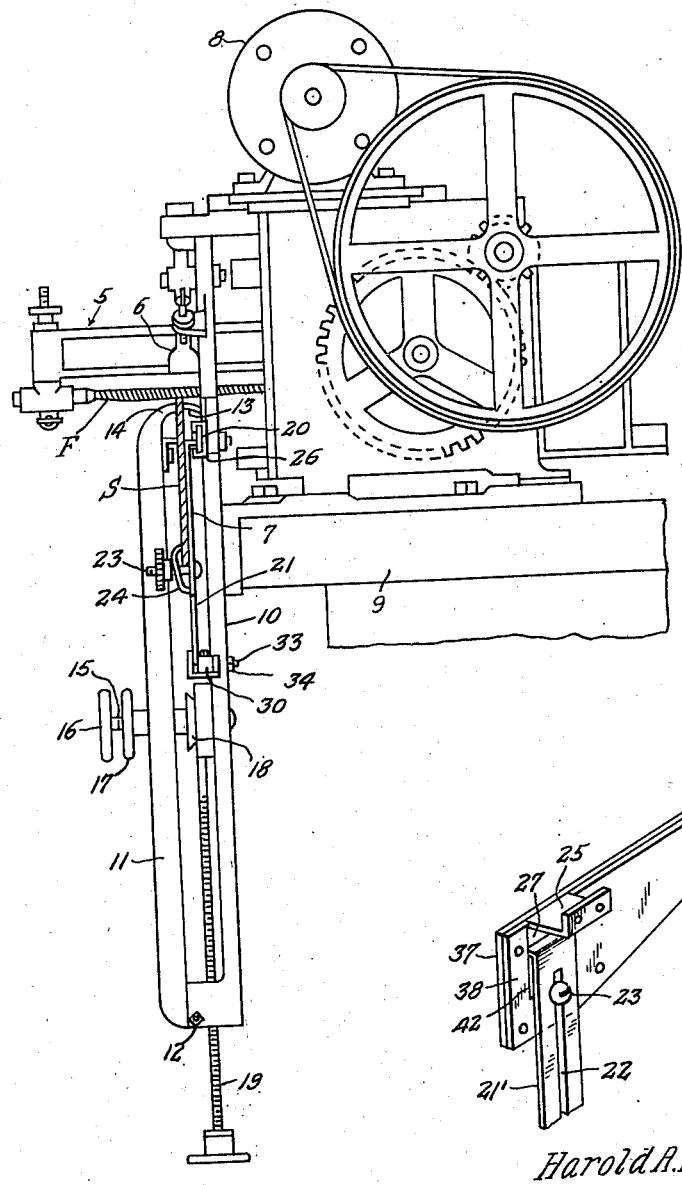
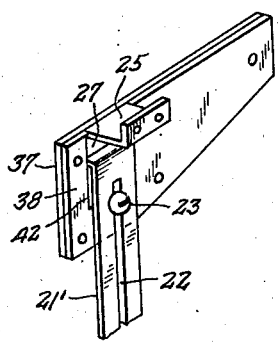
Inventor
Harold A. Hendrickson, Jr.
By Clarence A. O'Brien
and Harvey B. Jacobson
Attorneys Dec. 9, 1947.    H. A. HENDRICKSON, JR    2,432,420
SAW FILING MACHINE
Filed Aug. 1, 1945    3 Sheets-Sheet 3
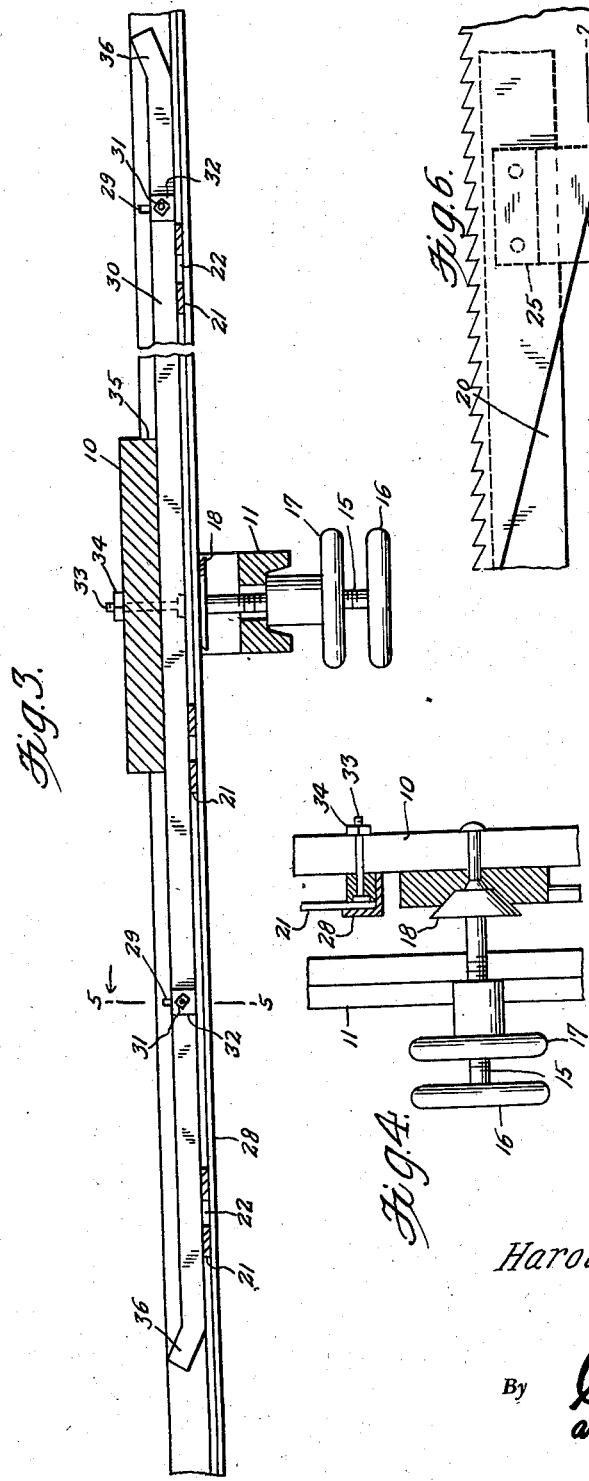
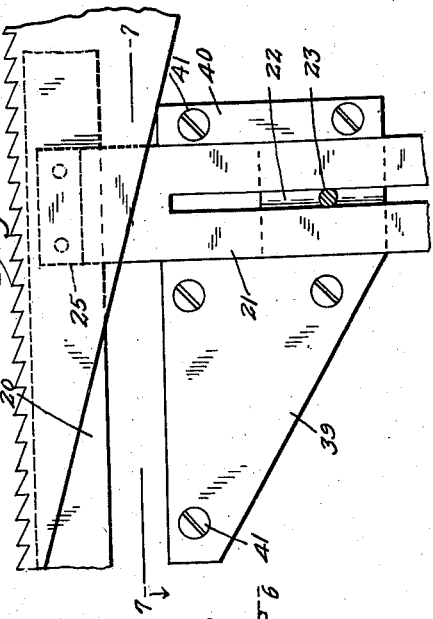
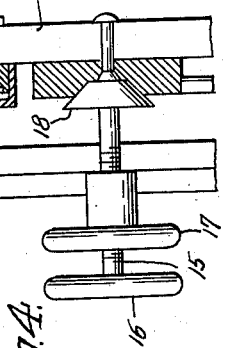
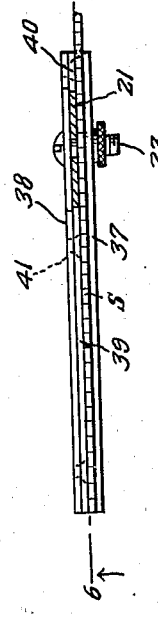
Inventor
Harold A. Hendrickson, Jr.
By Clarence A. O'Brien
and Harvey B. Jacobson
Attorneys Patented Dec. 9, 1947

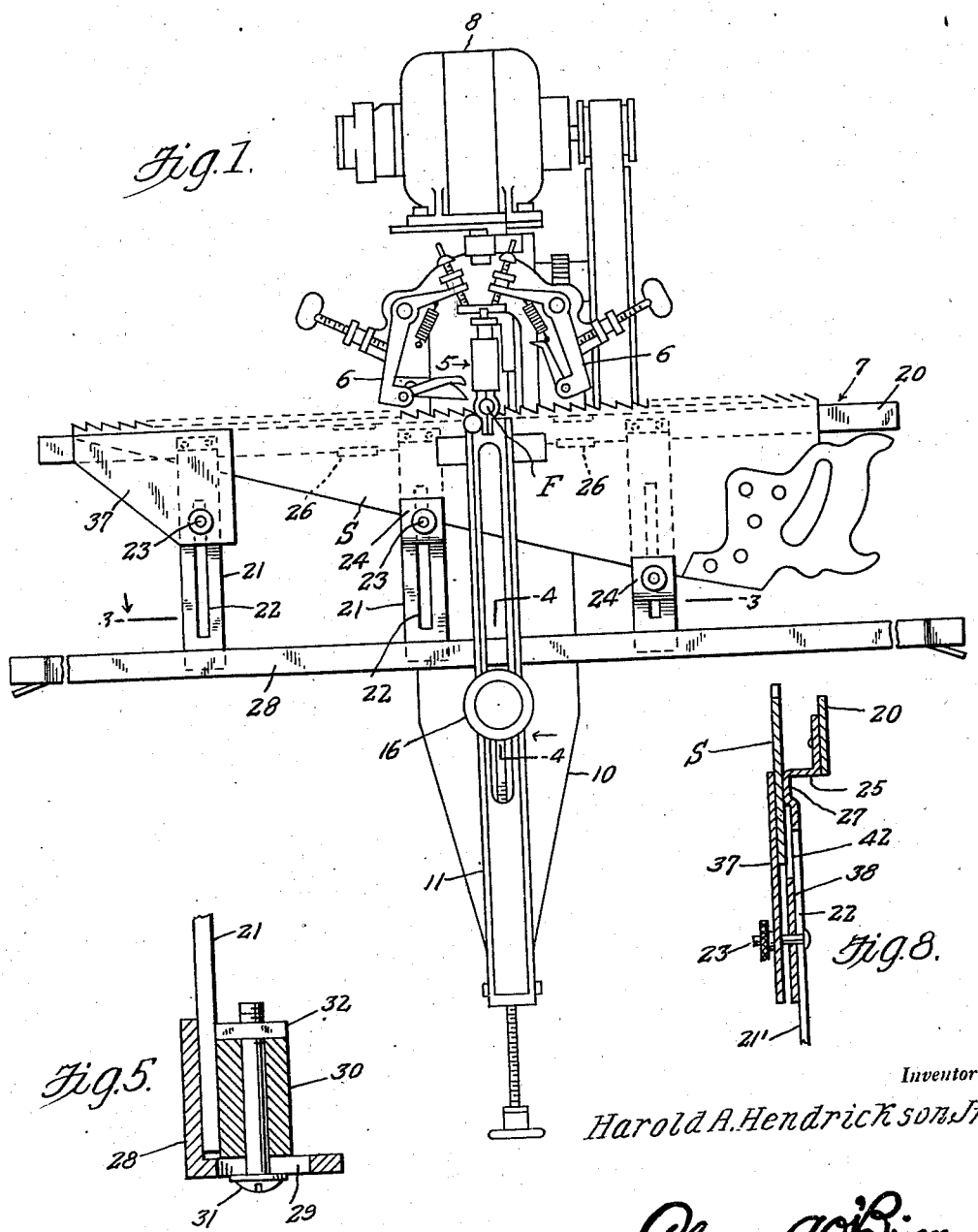

2,432,420

UNITED STATES PATENT OFFICE 2,432,420

SAW FILING MACHINE

Harold A. Hendrickson, Jr., Red Bank, N. J.

Application August 1, 1945, Serial No. 608,225

6 Claims. (Cl. 76—78)

1

This invention relates to saw filing machines of the type wherein the saw being filed is supported for traversing movement with respect to the file, movement being imparted to the saw by a pawl mechanism which is periodically moved during operation of the machine.

The present invention is particularly directed to improvements in the saw supporting means, and an important object of the invention is to provide an efficient guide device for the lower ends of the depending clamp-carrying arms of the saw carrier, so that the latter may have free end-wise movement but is most securely held against forward or rearward movement or vibration.

Another important object of the invention is to provide a novel form of clamp device for one of the depending arms of the saw carrier, which clamp device will securely hold the smaller end of the saw blade against vibration and will effectively engage such end of the blade even though the latter is relatively narrow or tapered substantially to a point.

A further object of the invention is to provide a clamp device of the above kind which is so constructed that it may be readily adapted or conditioned for use in connection with the carrier for a crowned saw or the carrier for a straight saw.

The exact nature of the present invention, as well as other objects and features thereof, will become apparent from the following description when considered in connection with the accompanying drawings, in which:

Figure 1 is a fragmentary front elevational view of a saw filing machine equipped with saw supporting means constructed in accordance with the present invention.

Figure 2 is a view principally in side elevation, of the construction shown in Figure 1.

Figure 3 is an enlarged fragmentary horizontal section taken substantially on line 3—3 of Figure 1.

Figure 4 is a fragmentary vertical section taken on line 4—4 of Figure 1.

Figure 5 is an enlarged section taken on line 5—5 of Figure 3.

Figure 6 is an enlarged fragmentary section taken on the line 6—6 of Figure 7 and showing details of the improved clamp device forming part of the present invention.

Figure 7 is a horizontal section taken on line 7—7 of Figure 6.

Figure 8 is a fragmentary vertical section showing the clamp device in use with a saw carrier.

Figure 9 is a perspective view of the construction shown in Figure 8 with the saw omitted.

The present invention is illustrated in connection with a saw filing machine having a carrier 5 for a file F and mechanism including levers 6 for automatically imparting a step by step feeding movement to a saw S mounted on a saw carrier 7, the file carrier 5 and levers 6 being actuated through suitable mechanism by means of a driving motor 8. The machine is mounted on a bench 9 and further includes a face plate 10 having a vise member 11 hinged thereto at 12, the plate 10 and member 11 having cooperating saw blade steadying jaws 13 and 14, respectively. The vice member 11 is drawn toward the face plate 10 by means of a screw 15 having a hand wheel 16 and a lock wheel 17. During the filing of a circular saw, the center of the saw is positioned at the cone surface 18 which may be vertically adjusted by means of an adjusting screw 19. The saw carrier comprises the usual horizontal bar 20 having a plurality of depending spaced arms 21 provided with vertical slots 22 which receive nutted bolts 23 that ordinarily pass through small clamping plates 24 for engagement with the saw blade along the back edge of the latter. The clamping plates 24 are thus adjustable vertically in accordance with the width of the saw blade. The arms 21 have rearwardly directed angular upper end portions 25 which are riveted or otherwise rigidly secured to the bar 20, and the bar 20 may be suitably guided for endwise movement as at 26, the guiding means for bar 20 being of the kind disclosed in the U. S. patent to F. E. Collier, No. 1,728,393, September 17, 1929, or 2,343,171, February 29, 1944. The saw carrier may embody arms 21 whose slotted portions are perfectly flat from end to end as shown in Figures 1 to 7 inclusive. Some carriers, however, have arms 21' whose slotted end portions are forwardly offset at their upper ends as indicated at 27 in Figures 8 and 9. Thus far described, the construction is old and well known in the art.

In actual practice, it has been found that the saw carrier is subject to objectionable lateral vibration, the guiding means for the bar 20 being insufficient to wholly prevent forward and rearward swaying of the depending arms 21. In order to effectively and positively prevent this objectionable vibration of the saw carrier and saw, I provide a guide device for the lower ends of the depending arms 21, which guide device permits free endwise movement of the saw carrier and provides sufficient clearance to permit slight vertical movement of the arms 21 as required when filing crowned saws. As shown, this guide device preferably consists of a suitable length of angle iron 28 having transverse elongated slots 29 in one flange thereof, and a guide bar 30 of suitable length and of rectangular cross section disposed on the slotted flange of the angle iron 28 and in spaced parallel relation to the other flange of the latter. Bolts 31 are extended through the slots 29 and through openings of the bar 30, and nuts 32 are threaded on the ends of the bolts 31 so as to secure the bar 30 in adjusted position so that the space between said bar 30 and the unslotted flange of angle iron 28 is just sufficient to accommodate the lower ends of the arms 21 with a snug sliding fit. The guide device is secured to the face plate 10 so as to extend across the latter in front of the same, with the slotted flange of angle iron 28 disposed horizontally and projecting rearwardly and with the unslotted flange vertically disposed. This positions the guide device parallel with the bar 20 in spaced relation to and below the latter, and the guide device is secured in this position by means of a bolt 33 passing through the guide bar 30 and the face plate 10 and having a nut 34 threaded thereon behind the plate 10. The horizontal flange of channel iron 28 is cut away intermediate its ends as at 35 so as to snugly receive the plate 10. In this way, the guide device is effectively braced against lateral movement about a vertical axis coincident with the bolt 33, and only the single bolt 33 is required to effectively rigidly fasten the guide device in place. It will thus be seen that the guide device effectively prevents forward or rearward movement of the lower ends of arm 21 while permitting endwise movement of the saw carrier. In this way, the saw carrier and the saw is effectively restrained against lateral vibration except for the extreme pointed end of the saw blade which projects beyond an end one of the arms 21. In order to facilitate passage of the arms 21 into the space between the vertical flange of angle iron 28 and the guide bar 30, the ends of said guide bar 30 are directed rearwardly as indicated at 36. When using the guide device in connection with a carrier for straight saws which has no limited vertical movement, said guide device may be adjusted vertically so that only slight clearance is provided between the lower end edges of arms 21 and the upper surface of the horizontal slotted flange of angle iron 28. In the case of a carrier for crowned saws which has slight vertical movement, the guide device will be lowered to provide sufficient clearance between the lower ends of arms 21 and the horizontal flange of angle iron 28 to permit this vertical movement of the saw carrier.

It has been found that the ordinary clamping plates 24 do not restrain the projecting small end portion of the saw blade against vibration. It has also been found that such ordinary clamping plates 24 may not be adjusted sufficiently high to properly engage and clamp the smaller end of a saw blade when such smaller end is narrow or tapered substantially to a point. I accordingly provide a special clamp device for use in connection with the end arm 21 adjacent the narrow end of the saw blade, whereby the projecting portion of the small or narrow end of the saw blade will be effectively braced against lateral vibration and may be effectively clamped even though this end of the saw blade is relatively narrow or tapered substantially to a point. As will be presently explained, this clamping device is so constructed that it may be readily adapted for use either with a carrier having flat arms as shown in Figures 1, 6 and 7, or for use in connection with a carrier having offset arms as shown in Figures 8 and 9. The clamping device in question comprises a pair of substantially similar relatively large main clamping plates 37 and 38 having openings in the lower portions of corresponding ends thereof for reception of a clamping bolt 23. Detachably secured to the inner or forward face of the plate 38 are spacer plates 39 and 40 which are spaced apart to snugly receive the adjacent arm 21 therebetween. The spacer plates 39 and 40 may be secured in place by means of stud screws 41 passed therethrough and threaded into the main clamping plate 38, the heads of the screws 41 being countersunk in the spacer plates. Spacer plates 39 and 40 are of a form and size corresponding to the portions of plates 37 and 38 at opposite sides of the arm 21. Also, the portions of plates 37 and 38 which project beyond the outer side of the associated arm 21 are relatively long so as to grip the projecting smaller end of the saw blade for substantially its full length. In addition, the plates 37 and 38 project a considerable distance above the clamping bolt 23 so that they will effectively engage and clamp the smaller end of the saw blade when adjusted to the upper limit of movement allowed by the slot 22 and even though the smaller end of the saw blade is relatively narrow or tapered substantially to a point. This has not been possible in connection with the use of the ordinary clamping plates 24 because the latter could not be adjusted sufficiently high to properly engage the smaller end of a saw blade when said end is extremely narrow or tapered substantially to a point. When using the clamp device in connection with the carrier having flat arms, the spacer plates 39 and 40 are attached to the plate 38 as described and the plate 38 is positioned behind the associated arm 21 so that the latter is received between the spacer plates 39 and 40 as shown in Figures 6 and 7. The clamping plate 37 is then disposed in front of the arm 21, bolt 23 is passed through the plates 37 and 38, and a nut is threaded on the bolt 23 so as to draw the plates 37 and 38 toward each other with the small or narrow end of the saw blade effectively clamped between the plate 37 and the spacer plates 39 and 40 and arm 21. When the clamp device is properly positioned, the upper edges of the plates 37 and 38 will be in close proximity to the teeth of the saw as shown in Figure 1.

In order to adapt the clamp device for use in connection with the carrier having offset arms, the spacer plates 39 and 40 are detached by removing the screws 41. In this connection, it is noted that the rear main clamping plate 38 is provided in its upper edge with a relatively deep rectangular cutout or notch as at 42. After removal of the spacer plates 39 and 40, the plate 38 is positioned in front of the arm 21' and the plate 37 is positioned against the front of the plate 38, the forward offset 27 of the arm 21' being received in the cutout or notch 42. The saw blade is thus received between the plates 37 and 38, flatly contacting plate 38 and the offset 27 at one side and the plate 37 at the opposite side as shown in Figure 8. The nut on bolt 23 is then tightened so that the saw blade is securely clamped in place. The cutout or slot 42 permits the plates 37 and 38 to be adjusted sufficiently high to effectively engage and clamp the small end of the saw blade even though the latter is narrow and tapered substantially to a point. It will thus be seen that the special clamp device eliminates vibration of the projecting narrow end of the saw blade while the guide device for the arms 21' eliminates all other objectionable vibration of the saw and saw carrier. This makes it possible to most readily and expeditiously proceed with the saw filing operation so that uniform satisfactory work may be accomplished without the exercise of special skill or care.

From the foregoing description, it is believed that the construction, operation and advantages of the present invention will be readily understood and appreciated by those skilled in the art. Minor changes may be made in details of construction illustrated and described, such as fall within the scope of the invention as claimed.

What I claim is:

1. In a saw filing machine having a face plate, the combination with a saw carrier embodying a horizontal bar provided with a plurality of depending arms carrying saw blade clamping plates, and means on the face plate cooperating with said horizontal bar for supporting the saw carrier for endwise movement, of a guide device mounted on the face plate and slidably receiving the lower ends of said depending arms so as to prevent lateral vibration of the saw carrier while permitting the endwise movement thereof, said guide device comprising a horizontal angle iron having a vertical flange and a horizontal flange projecting rearwardly from the lower edge of said vertical flange, a guide bar secured on the horizontal flange behind and in spaced parallel relation to the vertical flange so that the lower ends of the depending arms are received between the vertical flange and said guide bar, and means to rigidly secure the guide bar to the face plate.

2. The construction defined in claim 1, wherein the horizontal flange of said angle iron has a notch in its rear edge for snug reception of the face plate so as to restrain the guide device against lateral strains.

3. The construction defined in claim 1, wherein said horizontal flange of the angle bar has transverse elongated slots therein, and bolts passing through said slots and through the guide bar for adjustably securing the guide bar in the desired spaced relation to the vertical flange of the angle iron.

4. In a saw filing machine having a face plate, a saw carrier embodying a horizontal bar provided with a plurality of depending arms, saw blade clamping plates carried by all but one of said arms, means on the face plate cooperating with said horizontal bar for supporting the saw carrier for endwise movement, and a clamp device carried by said one arm for clamping the narrow end of the saw blade and restraining said end against lateral vibration, said clamp device comprising two substantially similar relatively large main clamping plates apertured in the lower portion of corresponding ends for reception of a clamping bolt passing through the arm, said plates being of a size to project beyond opposite sides of the depending arm and to extend into proximity of the teeth of a saw blade having a narrow end tapering substantially to a point, the other end portions of said plates projecting a material distance beyond the outer side of the depending arm for clamping engagement with the narrow end of the saw blade substantially throughout the length of said end.

5. In a saw filing machine having a face plate, a saw carrier embodying a horizontal bar provided with a plurality of depending arms, saw blade clamping plates carried by all but one of said arms, means on the face plate cooperating with said horizontal bar for supporting the saw carrier for endwise movement, and a clamp device carried by said one arm for clamping the narrow end of the saw blade and restraining said end against lateral vibration, said clamp device comprising two substantially similar relatively large main clamping plates apertured in the lower portion of corresponding ends for reception of a clamping bolt passing through the arm, said plates being of a size to project beyond opposite sides of the depending arm and to extend into proximity of the teeth of a saw blade having a narrow end tapering substantially to a point, the other end portions of said plates projecting a material distance beyond the outer side of the depending arm for clamping engagement with the narrow end of the saw blade substantially throughout the length of said end, one of said main clamping plates having a relatively deep notch in its upper edge portion of a width corresponding to the width of the depending arm.

6. In a saw filing machine having a face plate, a saw carrier embodying a horizontal bar provided with a plurality of depending arms, saw blade clamping plates carried by all but one of said arms, means on the face plate cooperating with said horizontal bar for supporting the saw carrier for endwise movement, and a clamp device carried by said one arm for clamping the narrow end of the saw blade and restraining said end against lateral vibration, said clamp device comprising two substantially similar relatively large main clamping plates apertured in the lower portion of corresponding ends for reception of a clamping bolt passing through the arm, said plates being of a size to project beyond opposite sides of the depending arm and to extend into proximity of the teeth of a saw blade having a narrow end tapering substantially to a point, the other end portions of said plates projecting a material distance beyond the outer side of the depending arm for clamping engagement with the narrow end of the saw blade substantially throughout the length of said end, one of said main clamping plates having a relatively deep notch in its upper edge portion of a width corresponding to the width of the depending arm, and spacer plates detachably secured on the inner face of one of said main clamping plates at opposite sides of the depending arm.

HAROLD A. HENDRICKSON, JR.

REFERENCES CITED

The following references are of record in the file of this patent:

UNITED STATES PATENTS

| Number | Name | Date |
| --- | --- | --- |
| 1,422,486 | Sherwood | July 11, 1922 |
| 1,491,706 | Klin | Apr. 22, 1924 |
| 1,610,392 | Stacy et al. | Dec. 14, 1926 |
| 1,994,332 | Baze | Mar. 12, 1935 |
| 2,287,265 | Oltmanns | June 23, 1942 |
| 2,333,298 | Daggett | Nov. 2, 1943 |